(12) United States Patent
Kersey

(10) Patent No.: US 6,681,067 B1
(45) Date of Patent: Jan. 20, 2004

(54) METHOD FOR SELECTIVE ERASING/APODIZATION OF THE INDEX OF REFRACTION OF AN OPTICAL WAVEGUIDE AND AN OPTICAL WAVEGUIDE MODIFIED BY THE METHOD

(75) Inventor: Alan D. Kersey, Glastonbury, CT (US)

(73) Assignee: CiDRA Corporation, Wallingford, CT (US)

( * ) Notice: Subject to any disclaimer, the term of this patent is extended or adjusted under 35 U.S.C. 154(b) by 141 days.

(21) Appl. No.: 09/706,438

(22) Filed: Nov. 3, 2000

(51) Int. Cl.$^7$ ................................................. G02B 6/34
(52) U.S. Cl. ......................................... 385/37; 359/566
(58) Field of Search ........................... 385/37; 359/566, 359/558

(56) References Cited

U.S. PATENT DOCUMENTS

| | | | | |
|---|---|---|---|---|
| 5,104,209 A | * | 4/1992 | Hill et al. | 359/569 |
| 5,625,472 A | * | 4/1997 | Mizrahi et al. | 359/34 |
| 5,745,617 A | * | 4/1998 | Starodubov et al. | 385/37 |
| 5,771,251 A | * | 6/1998 | Kringlebotn et al. | 372/6 |
| 5,830,622 A | | 11/1998 | Canning et al. | |
| 5,972,542 A | * | 10/1999 | Starodubov | 430/5 |
| 6,084,995 A | * | 7/2000 | Clements et al. | 385/10 |
| 6,137,931 A | * | 10/2000 | Ishikawa et al. | 385/37 |
| 6,204,969 B1 | * | 3/2001 | Jang | 359/566 |
| 6,229,827 B1 | | 5/2001 | Fernald et al. | |
| 6,229,941 B1 | * | 5/2001 | Yoon et al. | 359/566 |
| 6,356,681 B1 | * | 3/2002 | Chen et al. | 359/130 |
| 6,363,097 B1 | * | 3/2002 | Linke et al. | 359/3 |
| 6,456,762 B1 | * | 9/2002 | Nishiki et al. | 385/37 |

FOREIGN PATENT DOCUMENTS

| | | |
|---|---|---|
| WO | WO 00/37914 | 6/2000 |
| WO | WO 00/37969 | 6/2000 |
| WO | WO 00/39617 | 7/2000 |

OTHER PUBLICATIONS

U.S. patent application Ser. No. 09/455,868, T. Bailey, et al., filed Dec. 6, 1999.

"Transmission filters based on periodically micro–tapered fibre"; G. Kakarantzas, R. LeRous, T.A. Birks, P.St. J. Russell; Optoelectronics Group, Dept. of Physics, Univ. of Bath, Claverton Down, Bath BA2 7AY, UK; Cleo 2000, May 12, 2000, p. 574, CFC4.

* cited by examiner

Primary Examiner—Ellen E. Kim
(74) Attorney, Agent, or Firm—Ware, Fressola, Van Der Sluys & Adolphson LLP

(57) ABSTRACT

A method for erasing some or all of at least some of the grating elements of a grating inscribed in an optical waveguide such as an optical fiber or a cane structure (a more rigid optical waveguide), or, more generally, for selectively altering the index of refraction of a span of an optical waveguide, and products provided by the method. A temperature profile suitable for achieving a predetermined desired apodization (shaping of the grating strength) is determined, and then a focused laser beam, from for example a $CO_2$ laser, is directed to a target site on the optical waveguide selected as a suitable point from which to direct the laser beam and so introduce heat into the optical waveguide. The laser beam is held on the target site only so long as is necessary to create at least a portion of the temperature profile. The laser beam may then be redirected to other target sites on the optical waveguide, or may be swept along the optical waveguide at a rate suitable for creating further portions of the temperature profile. The laser beam may also be applied to an optical waveguide not having a conventional (small-scale) grating so as to create large-scale gratings, such as so-called long-period gratings, and including aperiodic and higher-functionality large-scale gratings.

37 Claims, 9 Drawing Sheets

METHOD FOR SELECTIVE ERASING/APODIZATION OF THE INDEX OF REFRACTION OF AN OPTICAL WAVEGUIDE AND AN OPTICAL WAVEGUIDE MODIFIED BY THE METHOD

FIELD OF THE INVENTION

The present invention pertains to the field of providing fiber Bragg gratings in optical waveguides such as optical fibers. More particularly, the present invention is directed to altering the index of refraction of at least some grating elements or of altering the index of refraction of an optical waveguide so as to provide various kinds of gratings besides conventional Bragg gratings, such as phase-shifted gratings, sampled gratings, long-period gratings and other gratings that provide higher levels of optical functionality.

BACKGROUND OF THE INVENTION

Fiber Bragg gratings and other grating elements (such as long period gratings used to couple core modes of propagation to cladding modes of propagation) are in widespread use in both telecommunications and sensing applications. In many applications, the grating spectral profile (i.e. the set of wavelengths reflected or transmitted by the grating) is vitally important to the performance of the device. To achieve a specific grating profile, the grating strength (the ultraviolet induced index change for each grating element) can be "apodized," i.e. the grating strength can be caused to vary spatially along the grating. Without apodization, a grating has a uniform strength, i.e. the strength is the same for all of its elements. Light reflected from such a grating includes not only wavelengths associated with the inter-element grating distance, but also sidelobes associated with the sharp edges of the grating region (sinc-squared sidelobes for standard unsaturated fiber Bragg gratings). To eliminate the sidelobes, apodization is used to reduce the grating strength smoothly from full strength at the center of the grating to zero strength at the edges of the grating.

Such sidelobes cause problems in many grating applications. In wavelength division multiplexing (WDM) applications, the sidelobes create out-of-band reflectivity, and in sensing applications, the sidelobes exacerbate the task of determining the grating central wavelength.

The prior art teaches using various ultraviolet beam profile shaping or beam modulation techniques for apodization. But such techniques must be performed as part of the original grating fabrication process. In addition, such techniques require sophisticated control mechanisms to achieve the required ultraviolet beam profile shaping or beam modulation.

What is needed is a simple method by which a grating can be thermally treated, post-fabrication, so as to produce an apodized grating with improved spectral characteristics, such as a spectral profile substantially free of sidelobes associated with the grating edges, or even spectral characteristics fundamentally different than those provided as a result of the fabrication process, such as would be achieved by selectively erasing the grating elements in the mid-section of a grating, leaving only the edge elements at full or near full strength, and so creating a cavity for a Fabry-Perot grating filter. Such a technique would clearly be useful in creating various kinds of gratings besides conventional Bragg gratings, such as phase-shifted gratings, long-period gratings, or higher functionality gratings.

SUMMARY OF THE INVENTION

Accordingly, the present invention provides a method for erasing some or all of at least some of the grating elements of a grating inscribed in an optical waveguide, such as in the core of an optical fiber, the method comprising the steps of:
providing a source of laser light having a beam intensity, the laser light having a wavelength that is at least partially absorbed by the optical waveguide material; determining a temperature profile suitable for achieving a predetermined desired apodization; determining a target site on the optical waveguide suitable for directing the laser light; determining how long to apply the laser light to the target site, based on the beam intensity, so as to create at least a portion of the temperature profile; and directing the laser light to the target site for the length of time determined to be necessary to create at least a portion of the temperature profile.

In a further aspect of the invention, the laser is a $CO_2$ laser.

In another, further aspect of the invention, a plurality of target sites are determined within the span of the grating and the laser beam is directed to each of the target sites so as to at least partially erase the grating at each target site and so as to provide a smooth transition between each target site and an adjacent target site from a reduced strength at the target site to approximately full strength midway between the target site and the adjacent target site and again to a reduced strength at the adjacent target site, thereby providing a higher-functionality grating.

In yet another, further aspect of the invention, the method further comprises the steps of determining a sweep rate as a function of position relative to the target site for sweeping the laser beam from the target site across a portion of the grating, and sweeping the beam across the portion of the grating at the sweep rate so determined. An equivalent procedure modulates the power of the laser beam while sweeping the laser beam across the portion of the grating at a constant (position-independent) sweep rate.

In still yet another, further aspect of the invention, instead of apodizing a grating in an optical waveguide, the present invention provides a method for creating a large-scale grating, such as a long-period grating or a large-scale aperiodic grating, in an optical waveguide, such as an optical fiber, beginning with a grating length of the optical waveguide over which the index of refraction is made to be substantially constant (i.e. without any appreciable index modulation over the grating length). The method then includes the steps of:
providing a source of laser light having a beam intensity, the laser light having a wavelength that is at least partially absorbed by the optical waveguide material; determining a temperature profile suitable for achieving a predetermined desired apodization suitable for creating a large-scale grating, the temperature profile including a plurality of points along the grating length at which the temperature of the optical waveguide is to reach a maximum value; determining how long to apply the laser light to each of the points along the grating length at which the temperature of the optical waveguide is to reach a maximum value, based on the beam intensity, so as to create the temperature profile within the optical waveguide; and directing the laser light to each of the points along the grating length at which the temperature of the optical waveguide is to reach a maximum value for the length of time determined to be necessary to create the temperature profile within the optical waveguide.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
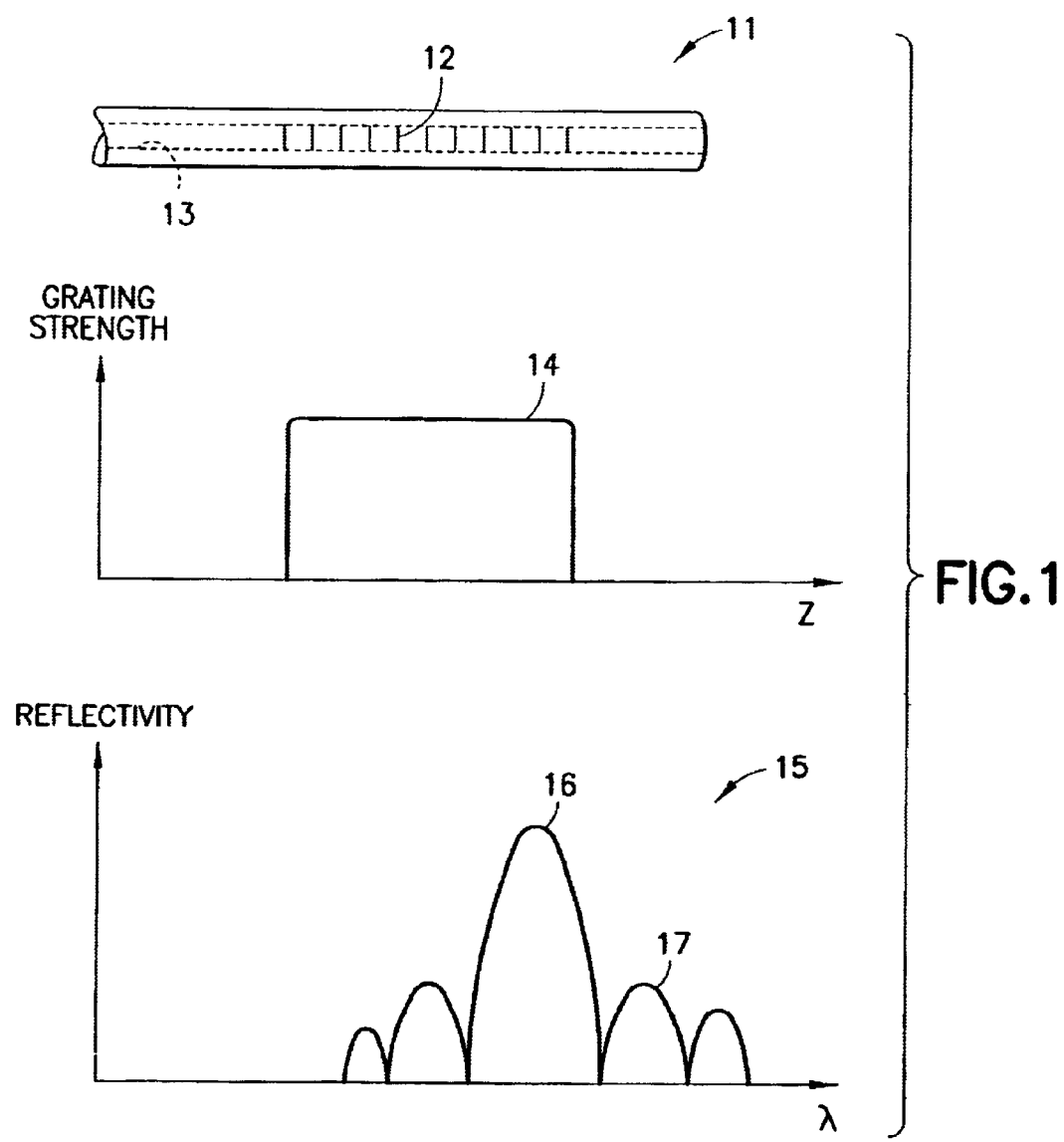
FIG. 1 is a schematic diagram of an optical fiber having a Bragg grating of uniform grating strength, and a corresponding graph of grating strength as a function of position along the grating along with a graph of the associated reflectivity of the grating as a function of wavelength showing a main reflected wavelength and sidelobes.

The present invention is a method for apodizing the grating strength of a grating such as a Bragg grating in an optical waveguide such as an optical fiber. The process of apodizing varies the grating strength as a function of position along the grating to achieve desired spectral characteristics of the grating. The apodizing is performed on a grating manufactured typically with a grating of uniform grating strength. FIG. 1 shows an optical fiber 11 having a Bragg grating 12 of uniform grating strength 14 (a so-called "flat-top" grating strength created in the original manufacture of the grating) and having a corresponding reflectivity 15 (as a function of wavelength) having a main peak 16 at the wavelength associated with the inter-element spacing of the Bragg grating and having sidelobes 17 associated with the sharp transition of the grating strength from full strength to substantially zero strength at the edges of the grating. The sidelobes 17 are usually undesirable, and apodization is used to smooth the grating strength so that it decreases from full strength to zero strength at a lower rate relative to position along the grating.

Figure 2:
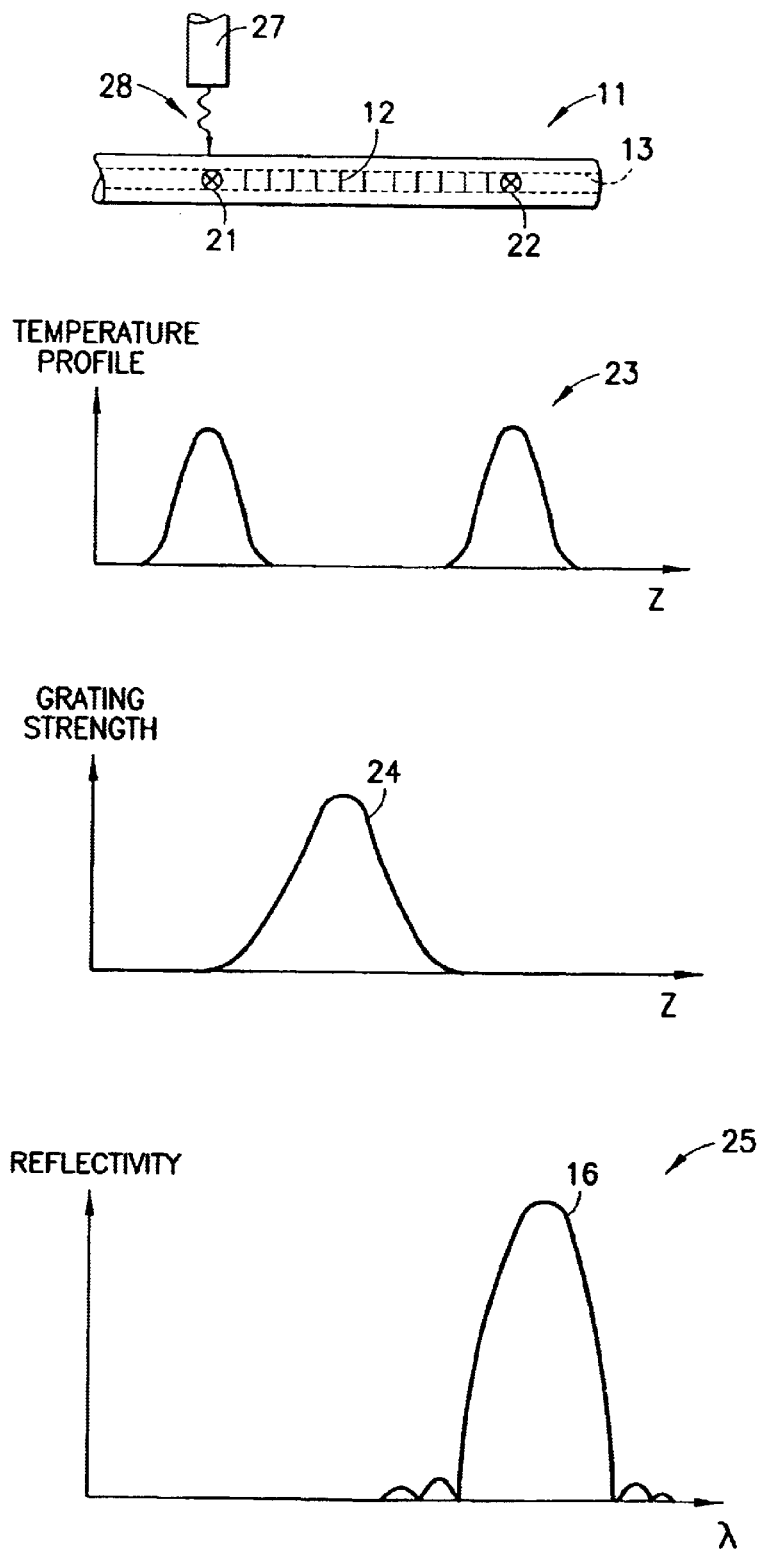
FIG. 2 is a schematic diagram of an optical fiber having a Bragg grating of uniform grating strength, and showing target sites on either side of the grating, target sites for directing a laser beam of an appropriate wavelength (i.e. a wavelength that is absorbed by at least some of the material from which the optical fiber is made, such as a $CO_2$ laser beam), and including a graph of a predetermined temperature profile as a function of distance along the grating, the temperature profile indicating the maximum temperature to be reached by different positions along the optical fiber as a result of the application of heat energy via the laser beam, the application of heat energy resulting in an apodization of the grating, and including a graph of the resulting grating strength as a function of position along the grating along with a graph of the corresponding reflectivity (as a function of wavelength) showing that the sidelobes of FIG. 1 are substantially eliminated.

Referring now to FIG. 2, the method of the present invention as applied to apodizing the grating strength of the grating 12 of the optical fiber 11 in FIG. 1 is shown as including the steps of determining target sites 21 22 for directing a laser beam to convey heat energy to the optical fiber 11. A temperature profile 23 predetermined to achieve the desired apodization (and implying the target sites 21 22) indicates the maximum temperature to which the optical fiber is to be raised, as a function of position along the optical fiber, in an application in which the uniform grating strength 14 (FIG. 1) is to be modified to produce the apodized grating strength 24 by selective erasure of elements of the grating. Because the apodized grating strength 24 will not have a sharp drop from full strength to substantially zero strength at the edges of the grating, the sidelobes of the reflectivity 25 resulting from the apodization are substantially suppressed. Only the major peak 16 survives the apodization.

The apodization of the present invention advantageously uses a "C02" laser to heat a waveguide having a Bragg grating to be apodized. In particular, a C02 laser providing a focused laser beam should be used, and in a typical apodization such as illustrated in FIG. 2, the laser beam should be directed to a target site long enough to raise the core temperature of the optical fiber to approximately 800° C. The laser beam should be applied only long enough to create the predetermined temperature profile, not long enough for the optical fiber to reach a uniform temperature throughout. Thus, a thermal gradient is created in the optical fiber so that the optical fiber material located at a position even a short distance from one of the target sites 21 22 is unaffected by the heat from the laser beam, and its temperature is therefore unchanged.

The grating elements of the grating in the optical fiber that see the highest temperature are more completely erased than elements that see a lower temperature. By suitably choosing the target sites, laser power, and the time of application of the laser beam to the optical fiber, the grating strength can be shaped in various ways, such as the shaping (apodizing) indicated in FIG. 2, yielding a Gaussian-like grating strength 24.

Figure 3A:
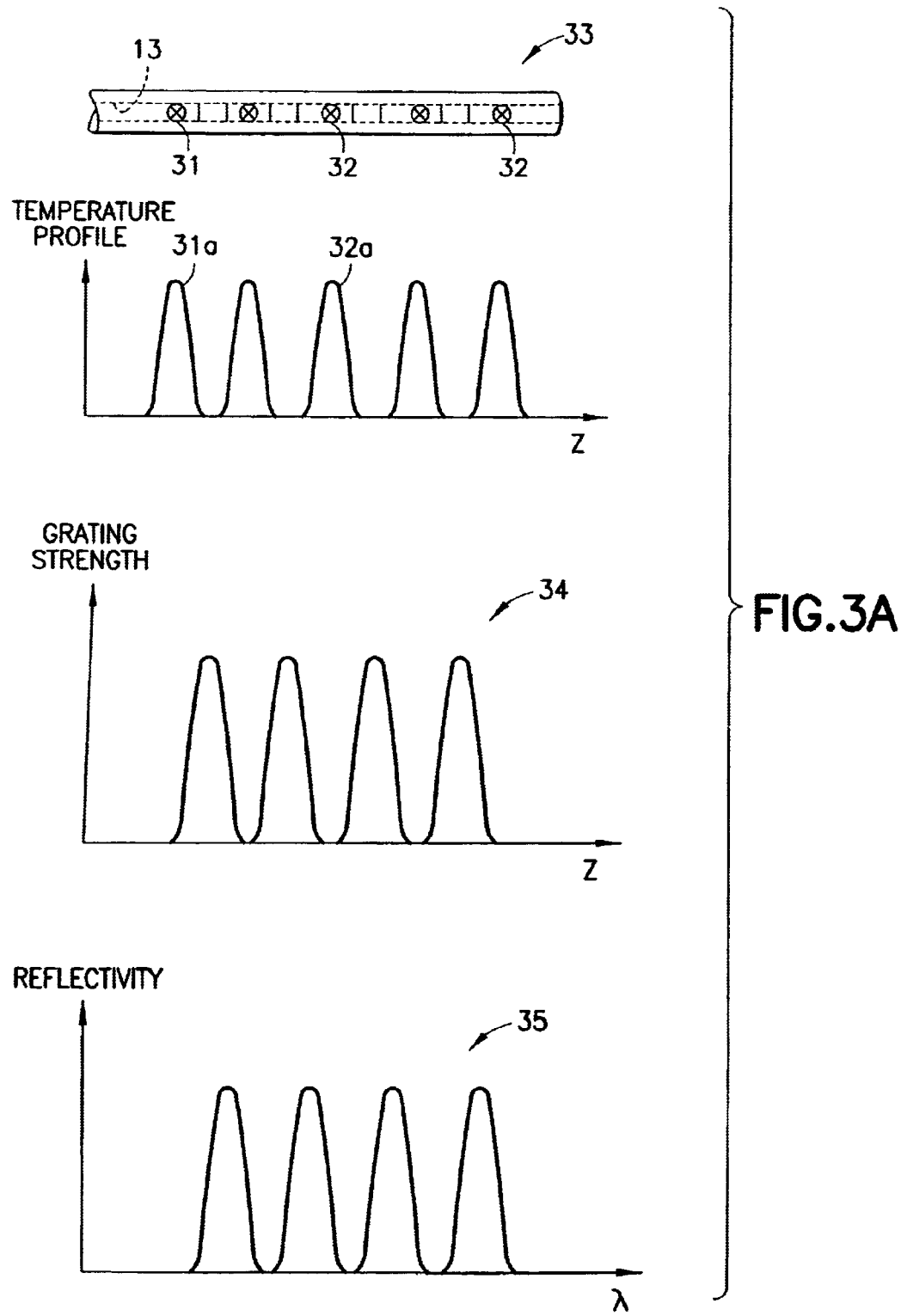
FIG. 3A is a schematic diagram of an optical fiber having a fiber Bragg grating of uniform grating strength, and showing target sites not only at the ends of the grating but also target sites at different positions along the grating, and including a graph of a temperature profile predetermined to provide by apodization a higher-functionality grating, and including a graph of the resulting grating strength as a function of position along the grating along with a graph of the corresponding reflectivity.

Referring now to FIG. 3A, an application of the apodization of the present invention to achieve a higher-functionality grating is indicated. In such an application, target sites 31 32 are determined not only at both ends of a grating 33 of uniform grating strength, but also at one or more positions, usually equally spaced, between the two ends of the grating. A (heating) laser beam, such as a $CO_2$ laser beam, is then directed to each of the target sites for a predetermined length of time so as to achieve a temperature profile that includes a peak 31a 32a corresponding to each target site. The effect on a uniform grating strength is to provide a grating strength 34 having a peak corresponding to each adjacent pair of target sites. A grating with such a grating strength is referred to as a sampled grating.

Figure 3B:
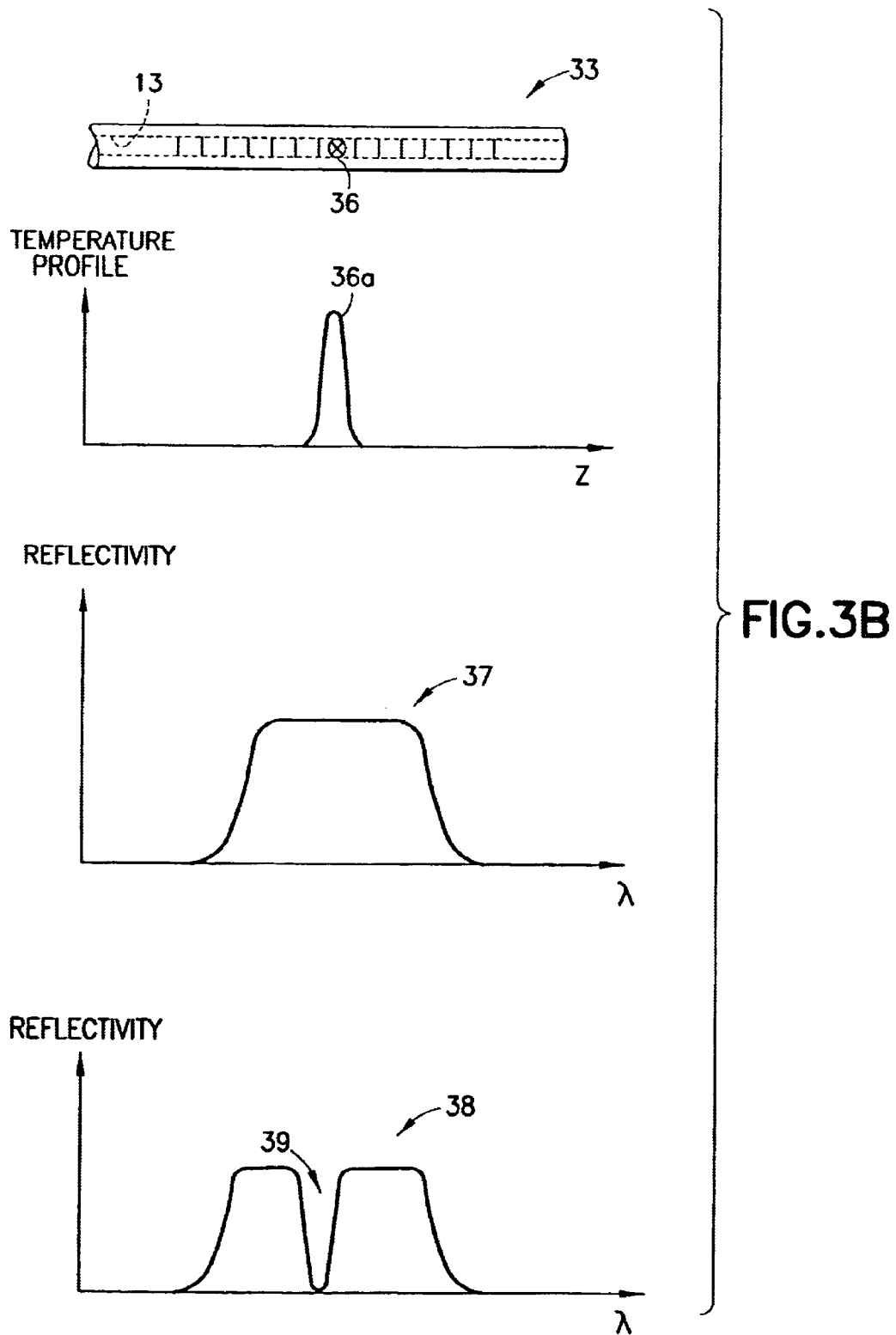
FIG. 3B is a schematic diagram of an optical fiber having a fiber Bragg grating of uniform grating strength, as in FIG. 3A, but showing a single interior target site, FIG. 3B also including graphs of reflectivity corresponding to the grating before and after apodization by directing a heating laser beam to the single interior site so as to produce what is the basic example of a higher-functionality grating, a so-called phase-shifted grating.

Referring now to FIG. 3B, if a (heating) laser beam is directed at only a single target site 36 of an optical fiber 33 having a Bragg grating in its core 13 so as to achieve a temperature profile 36a intended to substantially eliminate the grating elements at an interior point of the grating, then a so-called phase-shifted grating is produced. Such a grating is the basic example of a higher-functionality grating, of which the sampled grating discussed above is a more complex example. As also indicated in FIG. 3B, before the heating laser beam is applied, the reflectivity 37 of the grating has one center wavelength, and after the heating, the grating reflectivity 38 has two center wavelengths, the after-heating reflectivity having a notch 39. The heating is intended to erase enough of the grating elements and to cause enough of a change in the index of refraction of the optical fiber core (by eliminating its photosensitivity) that light reflected from the portion of the grating beyond the target site 36 is phase shifted, relative to light reflected from the portion of the grating before the target site, by a desired amount, including by as much as 180 degrees, in which case the grating is termed a π-phase-shifted grating. For a π-phase-shifted grating, the change in index must be such as to cause a relative optical path difference that is an odd integral multiple of half the wavelength of the reflected light.

Figure 4:
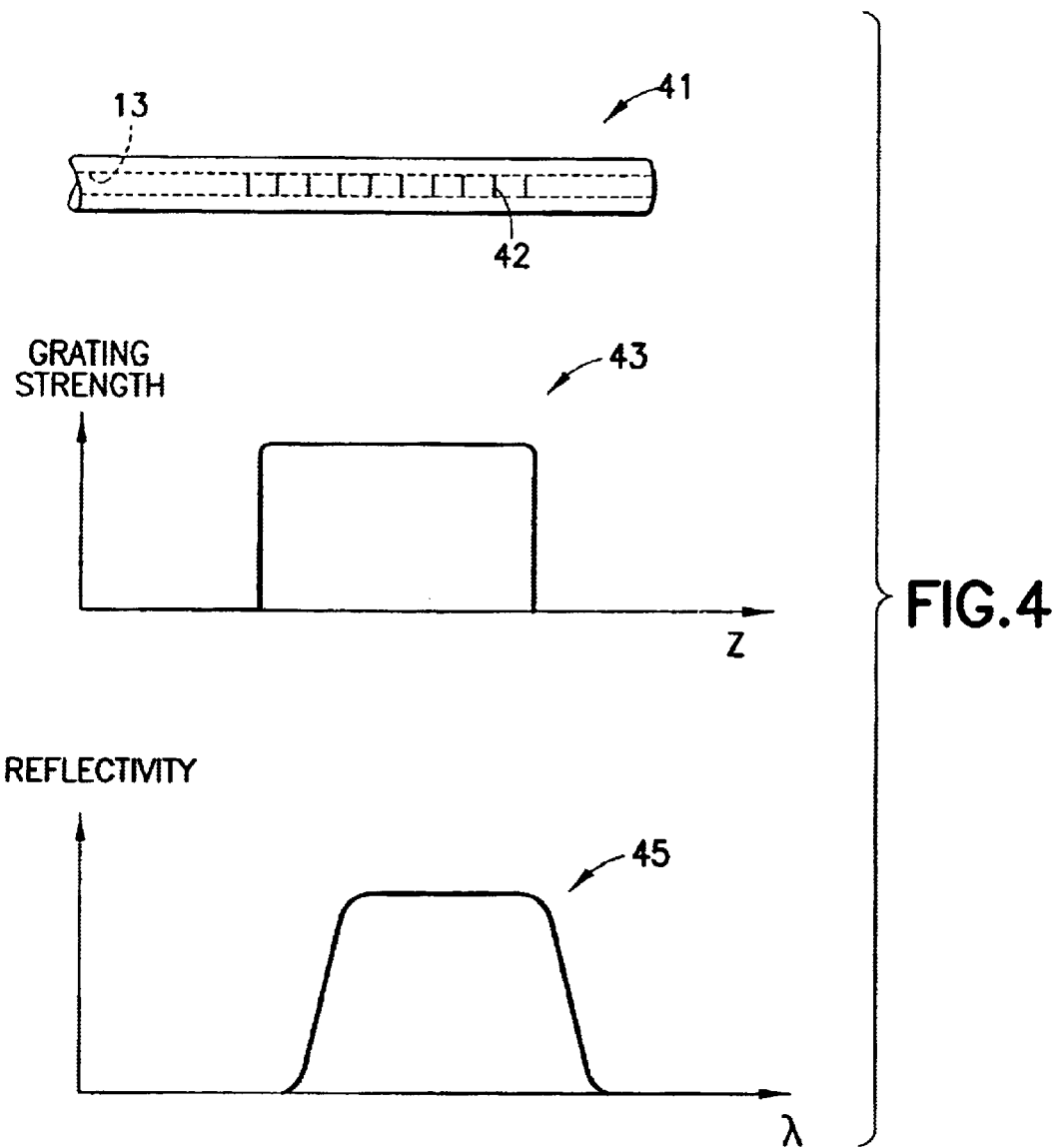
FIG. 4 is a schematic of an optical fiber having a chirped grating of uniform grating strength, the figure also including a graph of grating strength as a function of position along the grating and a graph of the corresponding reflectivity (the reflectivity including sidelobes that are undulations in the reflectivity at the edges of the region of substantial reflectivity, which however are not shown for clarity)

Referring now to FIG. 4, the apodization according to the present invention of a chirped grating is indicated as modifying the reflectivity 45 of a chirped grating 41 having a uniform grating strength 43. A chirped grating is a grating with a gradually increasing inter-element spacing, and so reflecting a set of wavelengths 45 46 rather than a single wavelength. Such a grating has reflectivity that includes a main peak and sidelobes that are undulations on the main peak at each of the two edges of the main peak (but which are not shown for clarity). Beginning with such a chirped grating, it is possible to apodize the grating strength to produce a shaped filter, as indicated in FIG. 5.

Figure 5:
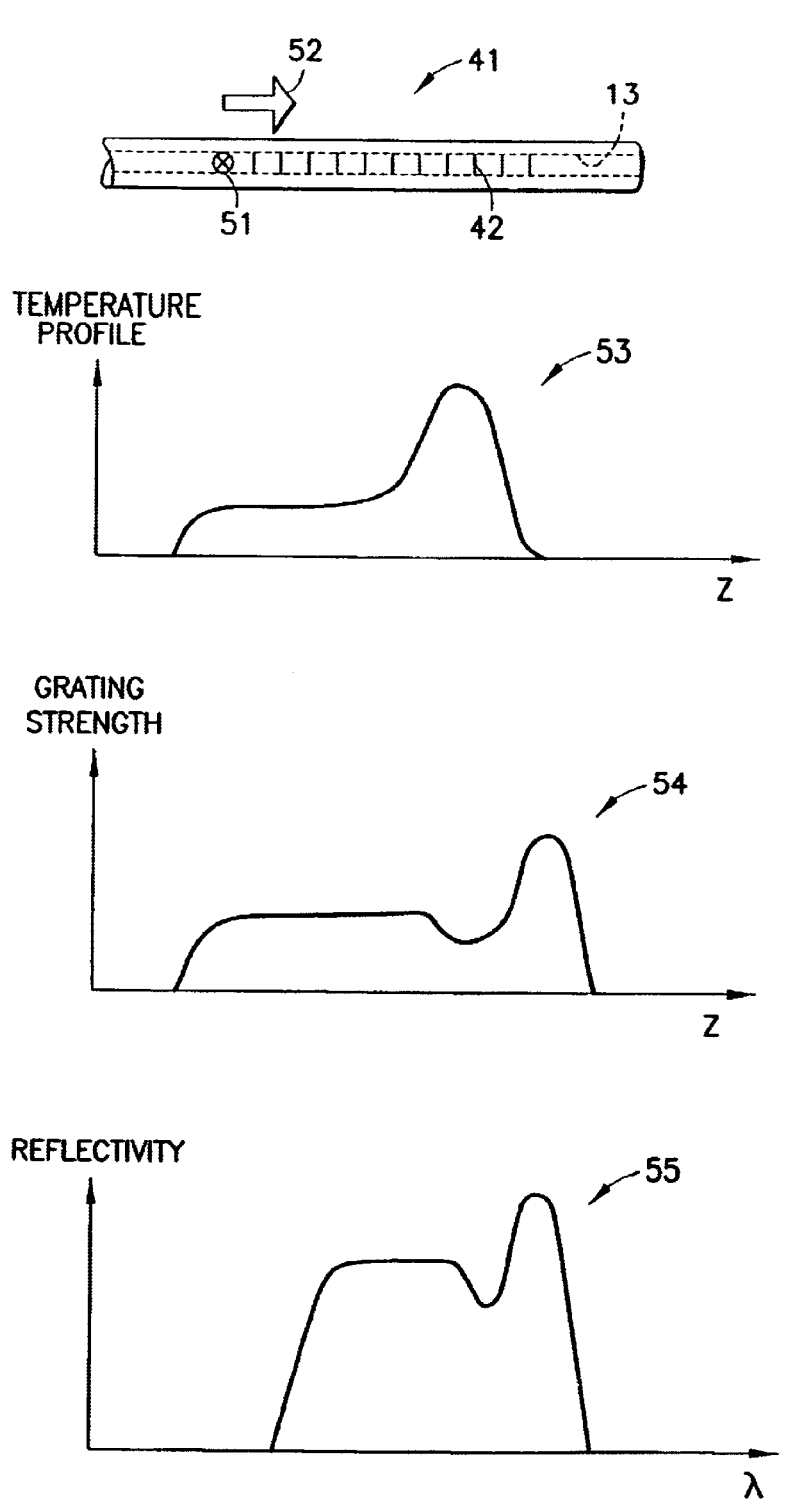
FIG. 5 is a schematic of an optical fiber having a chirped grating and having a target site for the initial application of heat energy, the heat energy to be applied first to the target site and then to other positions along the grating by sweeping the laser beam along the grating so as to achieve a predetermined temperature profile for apodizing the grating, a temperature profile intended to transform the reflectivity of the chirped grating so that the chirped grating is suitable for use as a shaped filter, and including a graph of the temperature profile predetermined to achieve the desired transformation, and including a graph of the resulting grating strength as a function of position along the grating along with a graph of the corresponding reflectivity of the apodized grating.

Referring now also to FIG. 5, a single target site 51 in an optical fiber 41 having a chirped grating 42, with the reflectivity indicated in FIG. 4, is selected and a temperature profile 53 is determined so as to achieve a grating strength 54 that will produce a reflectivity 55 such that the apodized chirped grating is suitable for use as a shaped filter. To create the temperature profile 53 in the optical fiber, a laser beam is directed at the target site 51 and then scanned along the optical fiber 41, as indicated by the arrow 52, so as to dwell at various positions along the chirped grating for a suitable period of time.

Another application of the present invention is to create a Fabry-Perot short cavity etalon by directing a laser beam to a target site located at a point along a grating and determining the time for exposing the optical fiber at the point to the laser beam so as to substantially eliminate the grating elements in the vicinity of the point and yet leave at essentially full strength the grating elements away from the point and at the edges of the grating. Although the use of the present invention to create a Fabry-Perot short cavity etalon as described here appears similar to the use of the present invention to create a phase-shifted grating as illustrated in FIG. 3B and discussed above, in creating a Fabry-Perot short cavity etalon, a relatively large span of a grating is erased (wiped out), creating a distinct cavity, compared to erasing only a relatively small number of elements of a grating in creating a phase-shifted grating.

Figure 6:
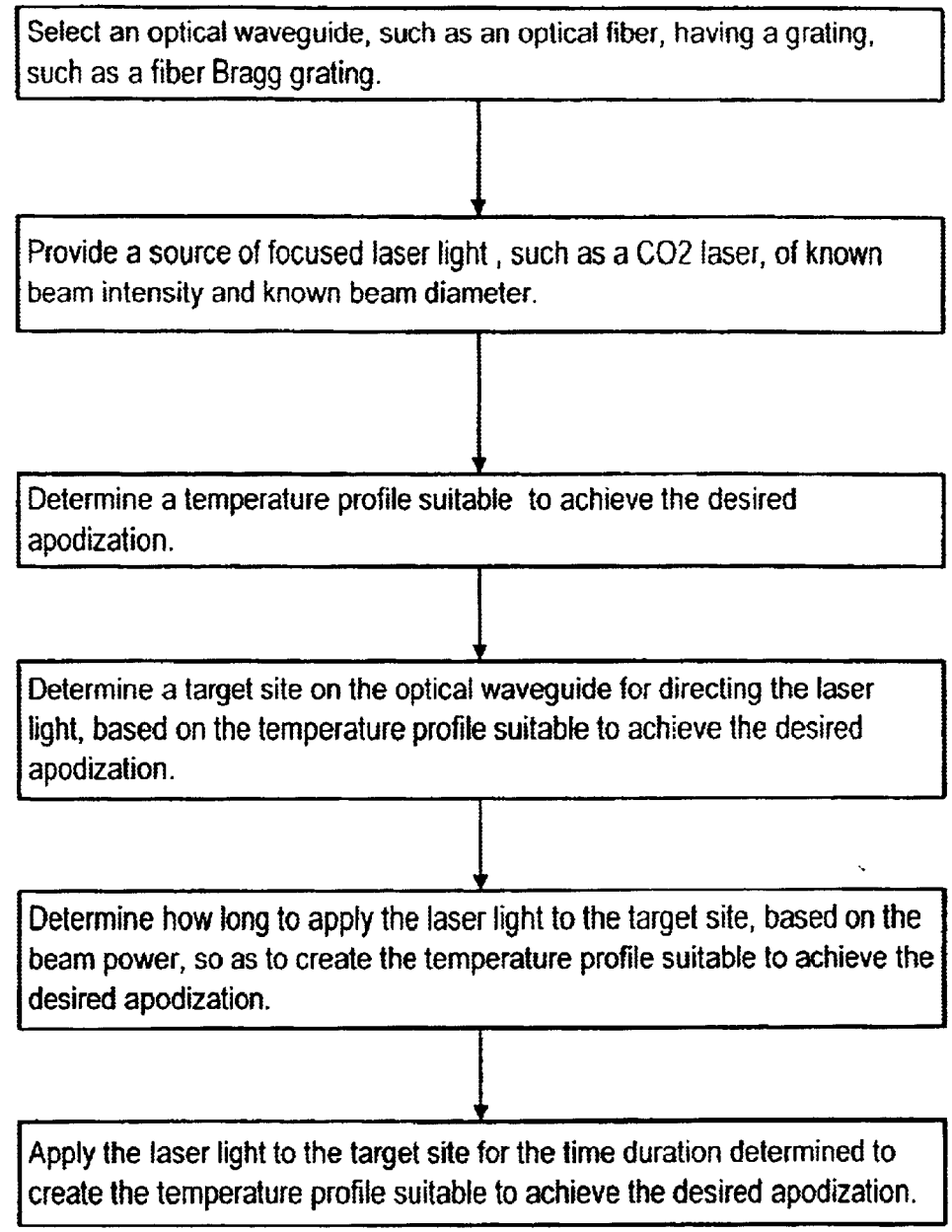
FIG. 6 is a flow chart of the method of the present invention for apodizing a grating such as a fiber Bragg grating according to the present invention so as to achieve predetermined spectral characteristics.

Referring now to FIG. 6, a flow chart is provided indicating the general steps of the apodization method of the present invention. The apodization to be performed is of course to be determined first, i.e. the steps of apodization according to the present invention assume that the (result of the) apodization is predetermined, i.e. it is known whether the apodization is for example to simply smooth a uniform grating, to produce a Fabry-Perot short cavity etalon, to produce a higher-functionality grating, or to produce a shaped filter based on a chirped grating. The method then begins with a step of selecting the optical waveguide having a grating for which the apodization is to be performed and obtaining a source of focused laser light, such as a $CO_2$ laser. The laser should have a known-beam intensity and a diameter that is suitably small depending on the grating to be apodized. Based on the desired apodization, the temperature profile to be created in the grating is determined. Having determined a desired temperature profile, a target site is next determined and the time for which to apply the laser beam to the target site is determined based on the beam intensity so as to create at least a portion of the desired temperature profile. Then the laser beam is directed to the target site for the length of time so determined. The laser beam may then be swept along the grating at a rate determined to achieve a further portion of the desired temperature profile, or the laser beam may be redirected to a second target site to create a further portion of the temperature profile.

Figure 7:
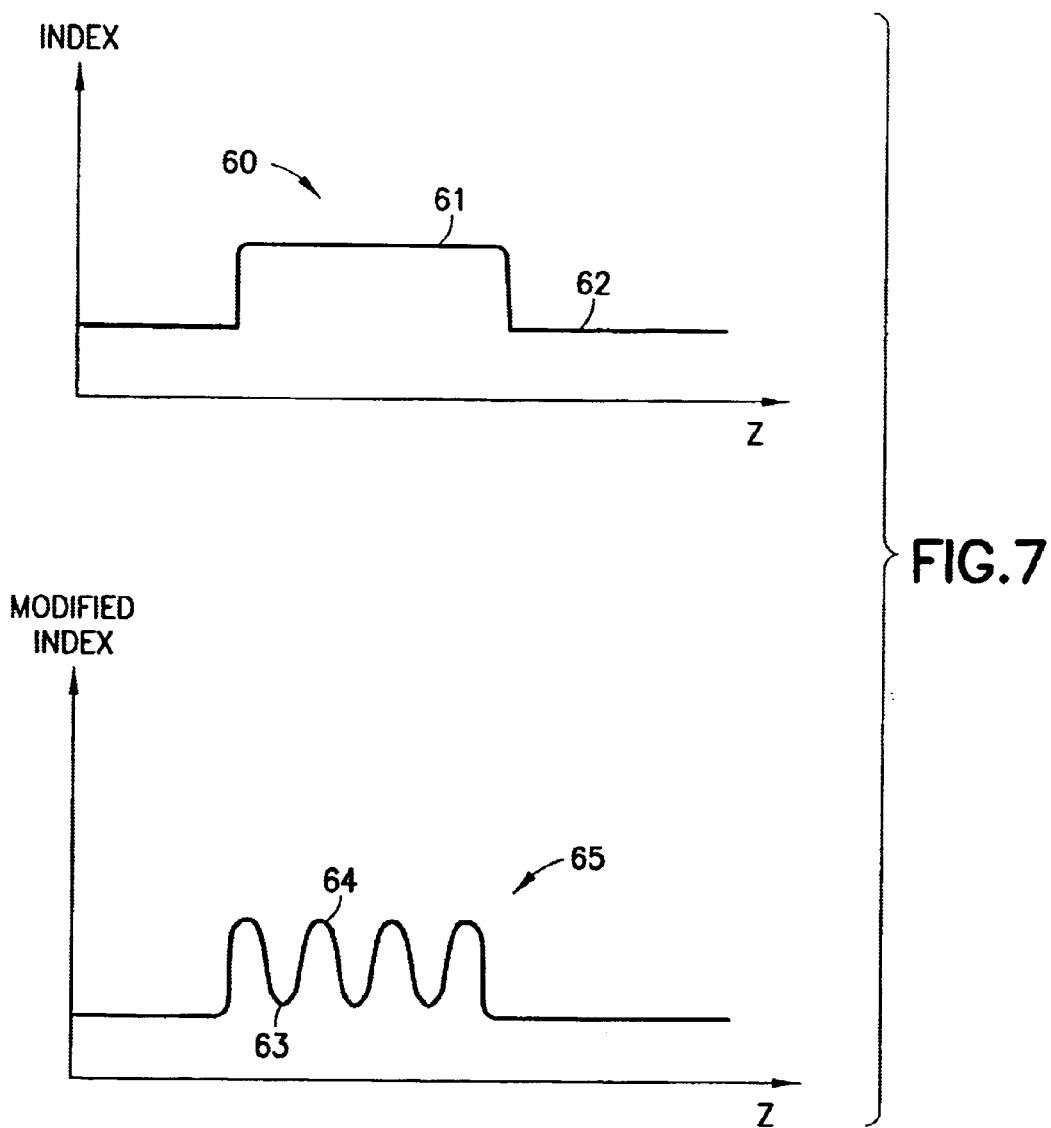
FIG. 7 is a graph showing the index of refraction of the core of an optical fiber following two steps used to create a long-period grating according to the present invention.

Referring now to FIG. 7, graphs 60 65 illustrate the index of refraction of the core of an optical fiber after two steps used to form a long-period grating using selective apodization (long compared to that of a conventional Bragg grating having a relatively short period). In this embodiment of the invention, in the first step, a laser is used to alter the native value of the index of refraction of the core of an optical fiber along a grating length of approximately several millimeters (so as to correspond to graph indicated as reference numeral 60) in such a way that the index is uniform along the grating length (the index for the grating length indicated as reference numeral 61) and appreciably different than the index outside of the grating length (the index outside of the grating length indicated as reference 62). Second, a $CO_2$ laser or other suitable laser (i.e. one producing light for which the optical fiber is opaque) is used to reduce the index back to its original value at various points along the grating length by directing the beam of the laser to the predetermined points along the grating length for a predetermined time. The result is a variation in the index of refraction of the core, the index at some points being unaffected by the heat applied to the various points along the grating length and the index at other points being reduced to the native value of the index, with a period in the variation that is on the order of millimeters instead of micrometers as in the case of a conventional Bragg grating. The index of refraction of the core after the apodization of the second step, as a function of position along the optical fiber, is indicated as curve 65 having peaks 64, too far from the point of application of the laser light to be affected, and having troughs 63, where the laser light is directly applied.

Figure 8:
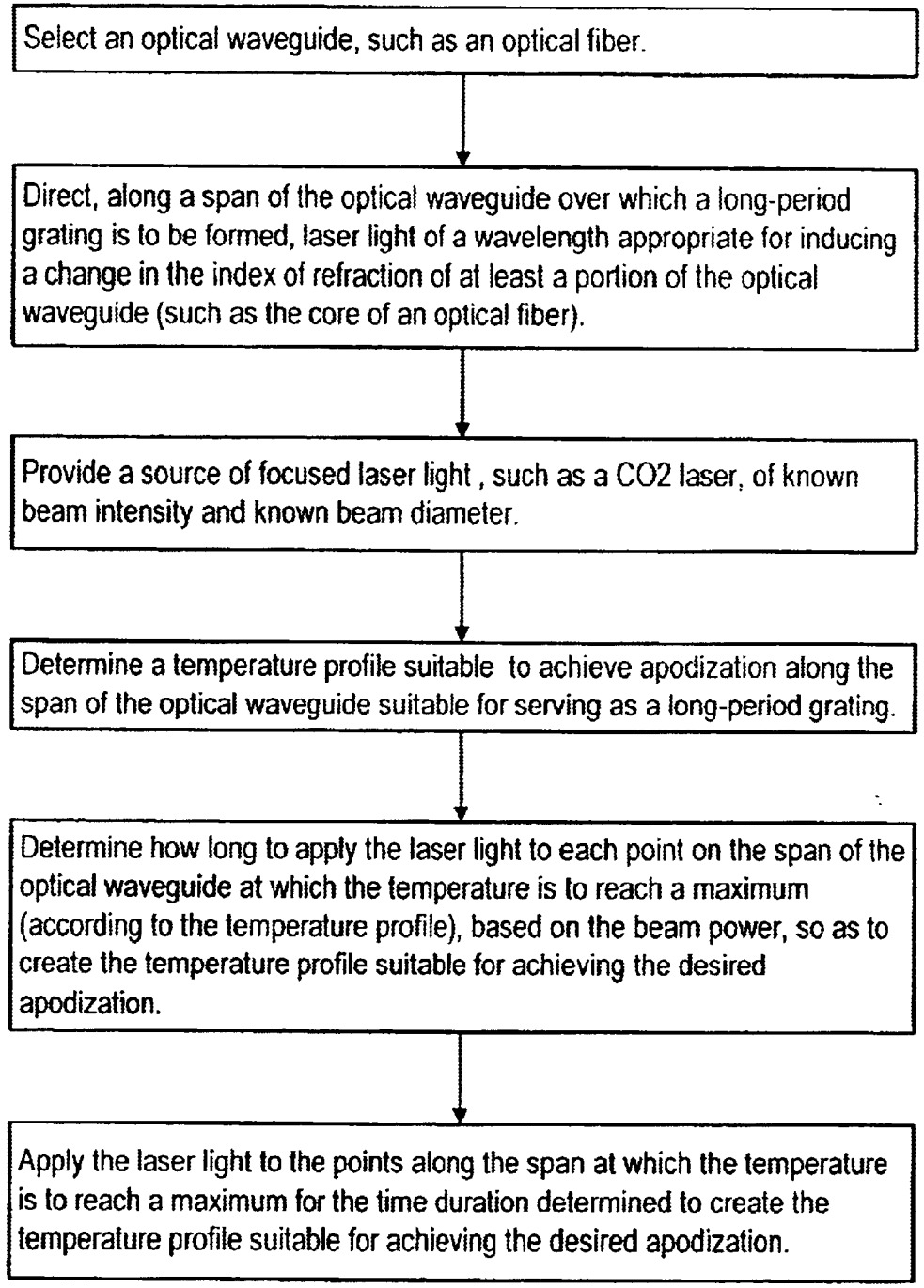
FIG. 8 is a flow chart of the method of the present invention for creating by apodization a long-period grating.

FIG. 8 indicates the steps according to the present invention for creating by apodization a long-period grating.

It is also clear that not only can the present invention be used to fabricate a long-period grating, but a large-scale grating with any sort of variation of inter-element spacing, since the laser beam is simply directed to the location of each subsequent element in turn. The fabrication of a conventional (small-scale) grating relies on creating a mask based on the interference of two (ultraviolet) light sources, and so the interelement spacing is not as easily controlled.

Note that whether according to the invention a long-period grating is being formed by apodization (and so starting with a blank optical waveguide, i.e. one not including a grating) or whether a grating in an optical waveguide is being modified by apodization, the process of apodization according to the invention involves the use of a heating laser, such as a $CO_2$ laser, to alter the index of refraction of the optical fiber.

The present invention has been described in case of apodizing gratings or index profiles along the length of an optical fiber. It should be understood however, that the present invention is in no way limited to creating specialized or tailored gratings in optical fibers. In particular, the present invention can be applied so as to create specialized or tailored gratings in what are here called stiffened (optical) waveguides or large diameter waveguides. Such large diameter waveguide structures are formed by glass collapsing technology shown and described in U.S. patent application Ser. No. 09/455,867 (CiDRA File No. CC 0036B), filed Dec. 6, 1999, as well as U.S. patent application Ser. No. 09/455,865 (CiDRA File No. CC-0078B), filed Dec. 6, 1999, both hereby incorporated by reference in their entirety, as discussed below in more detail. By way of example, the large diameter waveguide structures can be formed by taking an optical fiber and inserting it into an alignment tube of an inner diameter slightly larger than that of the outer diameter of the optical fibers, which is then collapsed on the optical fiber. In particular, the large diameter glass waveguide has a diameter of at least 3 millimeters and is formed by collapsing a first glass tube having a 1 millimeter diameter and a bore onto an optical fiber having a diameter of 125 microns arranged therein, then collapsing a second glass tube having a 3 millimeter diameter and a corresponding bore onto the first glass tube arranged therein.

The large diameter waveguide structures can also be in the form of a single large diameter waveguide known as a cane structure, shown and described in U.S. patent application Ser. No. 09/455,868 (CiDRA File No. CC-0230), filed Dec. 6, 1999, as well as patent application Ser. No. 09/456,112 (CiDRA File No. CC-0129B), filed Dec. 6, 1999, now U.S. Pat. No. 6,229,827 (issued May 8, 2001), both hereby incorporated by reference in their entirety.

It is to be understood that the above-described arrangements are only illustrative of the application of the principles of the present invention. Numerous other modifications and alternative arrangements may be devised by those skilled in the art without departing from the spirit and scope of the present invention, and the appended claims are intended to cover such modifications and arrangements.

What is claimed is:

1. A method for erasing some or all of at least some of the grating elements of a grating inscribed in an optical waveguide, the method comprising:

a) providing a source of laser light having a beam intensity, the laser light having a wavelength that is at least partially absorbed by the optical waveguide material;

b) determining a temperature profile suitable for achieving a predetermined desired apodization;

c) determining a target site on the optical waveguide suitable for directing the laser light;

d) determining how long to apply the laser light to the target site, based on the beam intensity, so as to create at least a portion of the temperature profile; and e) directing the laser light to the target site for the length of time determined in step (d).

2. The method of claim 1, wherein the laser is a $CO_2$ laser.

3. The method of claim 1, wherein a plurality of target sites are determined within the span of the grating and the laser beam is directed to each of the target sites so as to at least partially erase the grating at each target site and so as to provide a smooth transition between each target site and an adjacent target site from a reduced strength at the target site to approximately full strength midway between the target site and the adjacent target site and again to a reduced strength at the adjacent target site, thereby providing a higher-functionality grating.

4. The method of claim 3, wherein the laser is a $CO_2$ laser.

5. The method of claim 1, further comprising the steps of determining a sweep rate as a function of position relative to the target site for sweeping the beam from the target site across a portion of the grating, and sweeping the beam across the portion of the grating at the sweep rate so determined.

6. The method of claim 5, wherein the laser is a $CO_2$ laser.

7. A method for creating a long-period grating in an optical waveguide, comprising:

a) applying laser light to a grating length of the optical waveguide so as to produce a change, from an initial value, in the index of refraction of the core of the optical waveguide, the changed index of refraction being substantially constant over the grating length;

b) providing a source of laser light having a beam intensity, the laser light having a wavelength that is at least partially absorbed by the optical waveguide material;

c) determining a temperature profile suitable for achieving a predetermined desired apodization suitable for creating a large-scale grating, the temperature profile including a plurality of points along the grating length at which the temperature of the optical waveguide is to reach a maximum value;

d) determining how long to apply the laser light to each of the points along the grating length at which the temperature of the optical waveguide is to reach a maximum value, based on the beam intensity, so as to create the temperature profile within the optical waveguide; and e) directing the laser light to each of the points along the grating length at which the temperature of the optical waveguide is to reach a maximum value for the length of time determined in step (d).

8. The method of claim 1, wherein the optical waveguide is at least one of an optical fiber and a large-diameter optical waveguide.

9. The method of claim 7, wherein the optical waveguide is at least one of an optical fiber and a large-diameter optical waveguide.

10. An optical waveguide having an apodized grating, wherein the grating is formed from an original grating by:

a) providing a source of laser light having a beam intensity, the laser light having a wavelength that is at least partially absorbed by the optical waveguide material;

b) determining a temperature profile suitable for achieving a predetermined desired apodization of the original grating;

c) determining a target site on the optical waveguide suitable for directing the laser light;

d) determining how long to apply the laser light to the target site, based on the beam intensity, so as to create at least a portion of the temperature profile; and e) directing the laser light to the target site for the length of time determined in step (d).

11. The method of claim 10, wherein the optical waveguide is a cane structure.

12. The optical waveguide of claim 10, wherein a plurality of target sites are determined within the span of the grating and the laser beam is directed to each of the target sites so as to at least partially erase the grating at each target site and so as to provide a smooth transition between each target site and an adjacent target site from a reduced strength at the target site to approximately full strength midway between the target site and the adjacent target site and again to a reduced strength at the adjacent target site, thereby providing a higher-functionally grating.

13. The optical waveguide of claim 12, wherein the laser is a $CO_2$ laser.

14. The optical waveguide of claim 10, wherein the procedure forming the apodized grating further comprises the steps of determining a sweep rate as a function of position relative to the target site for sweeping the beam from the target site across a portion of the original grating, and sweeping the beam across the portion of the original grating at the sweep rate so determined.

15. The optical waveguide of claim 14, wherein the laser is a $CO_2$ laser.

16. The optical waveguide of claim 10, wherein the optical waveguide is at least one of an optical fiber and a large-diameter optical waveguide.

17. An optical waveguide having a long-period grating formed by:

a) applying a laser light to a grating length of the optical waveguide so as to produce a change, from an initial value, in the index of refraction of the core of the optical waveguide, the changed index of refraction being substantially constant over the grating length;

b) providing a source of laser light having a beam intensity, the laser light having a wavelength that is at least partially absorbed by the optical waveguide material;

c) determining a temperature profile suitable for achieving a predetermined desired apodization suitable for creating a large-scale grating, the temperature profile including a plurality of points along the grating length at which the temperature of the optical waveguide is to reach a maximum value;

d) determining how long to apply the laser light to each of the points along the grating length at which the temperature of the optical waveguide is to reach a maximum value, based on the beam intensity, so as to create the temperature profile within the optical waveguide; and e) directing the laser light to each of the points along the grating length at which the temperature of the optical waveguide is to reach a maximum value for the length of time determined in step (d).

18. The optical waveguide of claim 17, wherein the optical waveguide is at least one of an optical fiber and a large-diameter optical waveguide.

19. A method of modifying a grating disposed in an optical waveguide, the method comprising:

providing heat from a heat source; and applying the heat at a selected location of the grating for a selected time period so as to reduce the refractive index of at least a portion of the grating.

20. The method of claim 18, wherein the heat is applied to at least one end of the grating to reduce the reflectivity of the side lobes of the at least one end of the grating.

21. The method of claim 19, wherein the heat is applied to the ends of the grating to apodize the grating.

22. The method of claim 18, wherein the heat is applied to at least one end of the grating to substantially attenuate the reflectivity of the side lobes of the at least one end of the grating.

23. The method of claim 19, wherein the selected location is an intermediate location along the grating.

24. The method of claim 19, wherein the selected location is an intermediate location along the grating to provide a Fabry-Perot cavity.

25. The method of claim 19, wherein the selected location is an intermediate location along the grating to provide a n-phase shift grating.

26. The method of claim 19, wherein the selected location is a central location along the grating.

27. The method of claim 19, wherein the selected location is a plurality of intermediate locations along the grating.

28. The method of claim 27, wherein the plurality of intermediate locations are equally spaced apart.

29. The method of claim 19, wherein the selected location is a plurality of intermediate locations along the grating to provide a sampled grating.

30. The method of claim 19, wherein the selected location is a plurality of intermediate locations along the grating to provide a long period grating.

31. The method of claim 19, wherein the grating to be modified is at least one of a periodic grating, an aperiodic grating, a chirped grating, a short period grating and a long period grating.

32. The method of claim 18, wherein the optical waveguide is an optical fiber.

33. The method of claim 18, wherein the heat is applied to at least one selected location to attenuate the reflectivity of the grating to provide a desired filter shape.

34. The method of claim 18, wherein the heat source is a laser.

35. The method of claim 18, wherein the waveguide comprises a core and a cladding, the cladding having an outer transverse dimension of at least about 0.3mm.

36. The method of claim 18, wherein the grating strength of the portion of the grating is substantially eliminated.

37. The method of claim 18, wherein the grating strength of the portion of the grating is reduced but not eliminated.

* * * * *